Patented Jan. 9, 1940

2,186,687

UNITED STATES PATENT OFFICE 2,186,687

LIQUID PHENOL-FORMALDEHYDE RESIN COMPOSITION

Wesley R. Thompson and William E. Flood, Metuchen, N. J., assignors to Catalin Corporation of America, a corporation of Delaware No Drawing. Application February 1, 1938, Serial No. 188,066

8 Claims. (Cl. 260—30)

The present invention relates to phenol-formaldehyde liquid resin compositions particularly intended for use in the production of laminated bodies and as adhesives.

The phenol-formaldehyde liquid resins heretofore used for adhesive purposes have been predominantly of the type condensed in the presence of an alkaline catalyst and also hardened with an alkaline catalyst. Resins of the type produced by condensing with an alkaline catalyst and then acidified before hardening have many advantages from the standpoint of color, flexibility and the like when properly prepared. However, these resins have not been suitable for use as adhesives because of the fact that when acidified with organic acids in the usual way they are slow to cure, and when acidified with the strong mineral acids it has been practically impossible to control them; the strong acid has such a marked catalytic effect that it will cause the resin to set-up and harden prematurely.

Attempts have been made heretofore to speed-up the setting and bonding time of the above slow curing resins acidified with weak organic acids. These attempts consist principally in adding to the liquid resin, just prior to its application for adhesive purposes, a limited amount of a strong mineral acid, viz., hydrochloric acid. The hydrochloric acid makes the resin harden in a very short time even at room temperature. In fact it produces such a rapid setting action that the resin will set-up and harden almost immediately at room temperature, thereby complicating the application of the resin for adhesive purposes and requiring skilled labor. Because of these characteristics the hydrochloric acid cannot be added to the resin composition in any event until just prior to its use, which necessitates shipping the liquid resin and hydrochloric acid in separate containers and mixing of the two by the user. Furthermore, the presence of an appreciable amount of the hydrochloric acid in the finished product will cause it to crack and finally disintegrate.

In accordance with our present invention we have overcome the disadvantages and limitations of the prior liquid resin adhesives, such as described above, and have produced a phenol-formaldehyde liquid resin composition that is complete and ready for use as sold, that will not set or harden at atmospheric temperature while in transit or storage for reasonably long periods of time, that may be easily applied by brushing, spraying, dipping, etc., without precautions, and when heated will set and form a permanent bond in a remarkably short length of time for a normally stable type resin.

This invention is based upon our discovery that if a liquid resin is prepared by condensation of phenol and formaldehyde in the presence of an alkaline catalyst, subsequently slightly acidified with organic acids and dehydrated to the desired consistency, and then relatively small amounts of phosphoric acid are added, such phosphoric acid will have relatively little effect upon the resin at normal temperatures but at elevated temperatures will cause the resin to set and form an adhesive bond very rapidly. For example, when the resin is heated to a temperature of about 90° C. or higher the effect of the phosphoric acid becomes apparent immediately and gives a remarkably rapid cure to the resin. The speed of this cure will vary with the amount of phosphoric acid used which may, for example, range upwardly from as little as about 1% or 1.5%. Ordinarily it will not be advantageous to use more than 8% and a good working range is between about 2% to 4%. The amount required to produce a given setting time for the resin will depend somewhat upon the pH of the resin when the phosphoric acid is added.

In contrast to the functions of the hydrochloric acid attempted to be used heretofore, variations in amount of the phosphoric acid used in our new liquid adhesive permits of easy and accurate regulation of the setting rate of the adhesive from a few seconds time to any desired longer time. For example, with one form of the phenol-formaldehyde liquid resin slightly acidified with an organic acid, and the use of about 8% phosphoric acid, a thin film of the composition when subjected to a relatively high pressure and temperature of about 150° C. to 190° C. will set and form a highly effective bond in a few seconds time. Lowering the pressure, and lowering the temperature to about 80° C., and using about 2% phosphoric acid, will increase the setting time from a few seconds to several hours. By proper adjustment of these variables any desired setting time may be obtained easily.

This invention may be employed with varying proportions of phenol and formaldehyde. Thus it can be used with resins prepared by the condensation of substantially equal molecular proportions of these two ingredients, but the best results are obtained if more than 1.5 mols of formaldehyde are used of each mol of phenol, and preferably we use more than 2 mols of formaldehyde for each mol of phenol.

In carrying out the process of our invention, phenol and the usual commercial formaldehyde solutions are caused to react in the presence of an alkaline catalyst according to well known procedures; sodium hydroxide ordinarily is employed as the alkaline catalyst and the amount used ordinarily will range from about 1% to 3% based on the weight of the phenol. These values are given only by way of guidance and are not critical. The reaction is conducted with the aid of heat, but as is well understood in the art, the time of condensation will vary with the temperature.

After the preliminary condensation has taken place but preferably before the resin precipitates to any great extent while on the alkaline side, the resin will be neutralized and slightly acidified with an organic acid such, for example, as lactic acid, monochloracetic acid and phthalic acid. Mineral acids, such as sulphuric acid may be used provided the amount is so controlled that the pH of the resin does not fall below about 6, preferably about 7. Combinations of the organic and mineral acids may also be used. This neutralization or slight acidification may take place immediately after the condensation with the alkaline catalyst has been completed, or later after some dehydration, preferably with vacuum, of the resin. Following this initial neutralization or acidification of the mass, dehydration is continued until the water content of the resin is lowered to the point needed for use. Ordinarily this will be when the water content has reached a figure of from about 6% to 10%, but the resin may be employed with considerably more water than this, as for example, the water content may range up to about 16%.

We find that for use as an adhesive the resin of this invention is advantageously thinned with alcohol or other suitable solvent, which will ordinarily be added after dehydration of the resin is finished. Either before or after the addition of the alcohol and after the dehydration is either finished or substantially finished, the phosphoric acid is incorporated in the resin. The reason for delaying the addition of the phosphoric acid until this point is that this acid, in the percentages employed by us as the setting agent for the resin, which is already slightly acidified with organic or mineral acids, should not be heated substantially until the time of use. The temperature ordinarily should not exceed about 40° C. and preferably not above room temperature. If the phosphoric acid, in the amount required to give the resin the desired rapid setting time, is added to the resin first and then the resin dehydrated by heating the normal dehydration temperature of about 100° C. will cause the resin to set and harden before the dehydration is completed. Part of the phosphoric acid may be added during dehydration provided the amount is so controlled that the pH of the resin does not fall below about 3.2. After dehydration is complete the remainder of the phosphoric acid required for rapid setting may then be added.

In accordance with one illustrative but non-limiting example, our liquid resin adhesive composition may be prepared as follows:

Approximately 1000 parts of phenol, 1750 parts of formaldehyde (42½% strength) and 15 parts of 100% sodium hydroxide, which corresponds to 75 parts in a 20% solution, are refluxed for about one hour; then about 48 parts of 100% monochloracetic acid, in the form of a 50% solution, is added. The resulting mass is cooled by applying a vacuum and by cold water in a jacketed kettle. This treatment effects separation of the mass into resin and water layers. The pH of the mixture at this point is about 3.4. After cooling, the resinous solution is dehydrated under vacuum until the dehydrated residue is firm to the touch at a temperature of about 11° C. This dehydration treatment thickens the resin. The water content of the resin at this point may be within the range of about 6% to 16%.

To reduce the above partially dehydrated solution to the right consistency for adhesive purposes a suitable thinning agent such as for example denatured alcohol is added. The amount of alcohol used will usually range from about 10% to 60% by weight of the resin depending upon the specific application desired. The mixture of resin and alcohol is now ready for the addition of the phosphoric acid. In this example approximately 1.8 to 3.6 parts of 100% phosphoric acid are added to each 100 parts of the liquid resin, the exact amount of the phosphoric acid depending upon the setting rate desired. The phosphoric acid is normally used as a 50% or 85% solution. After the phosphoric acid has been added the resulting mixture is stirred at room temperature to effect intimate admixture of the acid and the liquid resin. The resulting acidified liquid resin composition, which has a pH of about 1.5 to 2 depending upon the amount of phosphoric acid used, is ready for use for bonding or other desired purposes. It is stable at room temperature but will harden rapidly at elevated temperatures.

For certain applications such as the laminating of porous wood we have found it desirable to incorporate in the acidified liquid resin an amount of inert filler such as for example, wood flour, asbestos flour, hemp hurds, and diatomaceous earth. For example, in laminating pieces of birch wood we have found it advantageous to add to the acidified liquid resin and alcohol mixture above described about 12½ parts of diatomaceous earth producing in this case a liquid adhesive composition containing the following approximate formula:

| | Per cent |
|---|---|
| Acidified phenol-formaldehyde resin | 53 |
| Filler (diatomaceous earth) | 11 |
| Alcohol | 36 |
| | 100 |

While the amount of phosphoric acid used in the adhesive composition may be varied appreciably we have found that when it is present in excess of about 7 parts to each 100 parts of the liquid resin it will cause some crystallization of salts, such as sodium phosphate if the resin has been previously reacted with a sodium hydroxide catalyst. The amount of salts so formed is relatively small but is sufficient to give the resin a milky color. This small amount of these salts will not prevent the liquid resin from functioning but if a light-colored transparent product is desired they may be eliminated by suitable filtration of the resin solution.

When the liquid resin composition is to be applied to materials that are not highly porous such as certain cloth and paper, we have found that it is not necessary to use a filler in the resin. In such cases our composition consists of the phenol-formaldehyde liquid resin produced as above with the addition of alcohol and the phosphoric acid. A specific example of such a composition would be as follows:

| | Parts |
|---|---|
| Liquid resin containing 40% alcohol | 100 |
| 100% phosphoric acid | 2 to 4 |

Another illustrative but non-limiting example of the preparation of the resin composition of our invention is as follows:

Approximately 1000 parts of phenol, 2000 parts of formaldehyde (37% strength) and 15 parts of 100% sodium hydroxide are refluxed for about 40 minutes; then about 81 parts of 50% lactic acid is added. The resulting mass is cooled by applying a vacuum and by cold water in a jacketed kettle. Under these conditions the resin and water do not separate and the pH of the resin solution at this stage is about 4.3. The solution is then dehydrated under vacuum as explained hereinabove until the desired water content is obtained. About 40% alcohol is added to the dehydrated liquid resin to thin it to the desired consistency. Finally about 8% phosphoric acid is incorporated in the liquid resin-alcohol solution to form the potentially adhesive liquid resin composition, which when heated above about 80° C. will harden into an adhesive infusible mass.

The alcohol or other suitable solvent used for thinning the resin composition helps to keep the composition stable when not in use, that is, prevent the phosphoric acid from setting-up the resin during storage or transit over long periods of time. However, even when no alcohol is present the resin, with incorporated phosphoric acid, will remain stable at room temperatures for at least several days, which is of substantial advantage in commercial processes where production is interrupted for several hours or days, leaving some of the resin composition freed of alcohol but not finally applied for bonding.

The new liquid adhesive resin composition of our invention is applicable to various laminating procedures, with improved results. For example, we have produced commercially satisfactory products by laminating at a rapid rate various types of wood, cloth, paper and sheet resin using our adhesive composition as the fast setting bonding agent.

An example of one commercial use of our composition to produce very rapidly an improved laminated or combined product is in the manufacture of upholstery material for automobiles and other interior furnishings, involving the combining of paper, batting and fabric. Such materials are made in large quantities and require exceedingly rapid production. For this purpose the liquid resin, prepared according to the first process example above and containing about 40% of ethyl alcohol and about 8% phosphoric acid based upon the weight of solid resin in the composition, may be used. This resin composition is applied to both sides of the batting and the latter heated to about 80° F. for two minutes to drive off the alcohol content of the composition. The batting with resin films is then located between a sheet of cloth and paper. This assembly is then placed in a press between platens heated to about 300° F.–350° F. and pressure applied for about four seconds. The pressing time may vary between about 3 to 10 seconds depending upon the exact temperature used. The temperature and time of pressing is adjusted such that the required bond between the several sheets will be obtained without scorching the paper or fabric.

Various other combinations of paper and fabric with or without batting may also be obtained by using our improved fast setting liquid resin adhesive composition.

Another commercial use for our composition is in the combining of pieces of wood for the production of ply wood. For this purpose the resin composition may be prepared according to the second process example given above, using lactic acid for the initial acidification. To this liquid resin is added about 40% alcohol and 4% phosphoric acid, based upon the weight of solid resin content. About 11% of filler, such as described hereinabove, is thoroughly mixed in the composition to prevent undue absorption of the latter by the wood. The composition is now applied to the surfaces of the several pieces of wood to be joined, by brushing or spraying the liquid thereon, and the coatings so produced dried either by air or more rapidly if desired in an oven heated to about 80° C., to liberate the alcohol content. The coating after this drying operation is still tacky. The coated pieces of wood are then superimposed in the desired arrangement and thickness and the assembly pressed between platens heated to about 290° F. under a pressure of about 150 pounds per square inch. This pressing is continued for about one and a half minutes plus one minute for each 1/24 inch wood thickness. The resulting product is strongly bonded together and is ready for immediate use.

Various modifications and changes may be made in the materials, processes and products described hereinabove without departing from the scope of our invention.

We claim:

1. A liquid resin composition which will not harden at room temperatures but will harden relatively rapidly at elevated temperatures, comprising the reaction products resulting from reacting at least 1.5 mols of formaldehyde and one mol of phenol in the presence of an alkaline catalyst and subsequently rendering the solution slightly acid and dehydrating, and about 1% to 8% of phosphoric acid.

2. A liquid resin composition which will not harden at room temperatures but will harden relatively rapidly at elevated temperatures, comprising an acidic phenol-formaldehyde liquid resin; which has been produced by condensation of at least 1.5 mols of formaldehyde and 1 mol of phenol with an alkaline catalyst, subsequently acidified, dehydrated, and thinned with ethyl alcohol which has a retarding effect up the resin setting at room temperatures; a filler and about 1% to 4% phosphoric acid.

3. A liquid resin composition which will not harden at room temperatures but will harden relatively rapidly at elevated temperatures, comprising about 100 parts of an acidic phenol-formaldehyde liquid resin; which has been produced by condensation of at least 1.5 mols of formaldehyde and 1 mol of phenol with an alkaline catalyst, subsequently acidified, dehydrated, and thinned with ethyl alcohol which has a retarding effect upon the resin setting at room temperatures; and about 2 to 4 parts of phosphoric acid.

4. A process of producing a liquid resin adhesive composition, which will not set at room temperatures but will set rapidly at elevated temperatures to form an adhesive bond suitable for laminating various materials, comprising reacting about one mol phenol and at least 1.5 mols of formaldehyde in the presence of an alkaline catalyst, neutralizing the reaction mass, partially dehydrating the neutralized solution, thinning said solution with ethyl alcohol which has a retarding effect upon the resin setting at room temperatures, and adding a sufficient amount of phosphoric acid to cause said solution to harden rapidly at the desired elevated temperature.

5. A process of producing a liquid resin adhesive composition, which will not set at room temperatures but will set rapidly at elevated temperatures to form an adhesive bond suitable for laminating various materials, comprising reacting about one mol of phenol and at least 1.5 mols of formaldehyde in the presence of an alkaline catalyst, neutralizing the reaction mass with a mineral acid, partially dehydrating the neutralized solution, thinning said solution with ethyl alcohol which has a retarding effect upon the resin setting at room temperatures, and adding a sufficient amount of phosphoric acid to cause said solution to harden rapidly at the desired elevated temperature.

6. A liquid adhesive, phenol-formaldehyde resin composition characterized by containing about 1% to 8% of phosphoric acid, and an amount of ethyl alcohol to render the composition sufficiently fluid for application as a bonding adhesive and to have a retarding effect upon the setting action of the adhesive at normal temperatures, said phosphoric acid having substantially no setting effect upon the adhesive composition at normal temperature but causing rapid setting of said composition at elevated temperatures, said phenol formaldehyde resin consisting of substantially the reaction product obtained by condensation of about 1 mol of phenol with at least 1.5 mols of formaldehyde in the presence of an alkaline catalyst followed by partial dehydration and neutralization with an acid prior to the incorporation of said phosphoric acid.

7. A liquid resin composition which will not harden at room temperatures, but will harden relatively rapidly at elevated temperatures comprising a liquid phenol formaldehyde resin and about 1% to 8% of phosphoric acid, said resin comprising the reaction product resulting from reacting at least 2 mols of formaldehyde with 1 mol of phenol in the presence of an alkaline catalyst and subsequently neutralizing the excess alkali in the solution.

8. A liquid resin as defined in claim 7 and further characterized by an amount of ethyl alcohol to render the composition sufficiently fluid for application as a bonding adhesive and to have a retarding effect upon the adhesive at normal temperature, but being evaporative at elevated temperatures to permit hardening of the resin.

WESLEY R. THOMPSON.
WILLIAM E. FLOOD.

CERTIFICATE OF CORRECTION.

Patent No. 2,186,687. January 9, 1940.

WESLEY R. THOMPSON, ET AL.

It is hereby certified that error appears in the printed specification of the above numbered patent requiring correction as follows: Page 2, second column, line 72, for "15% parts" read 15 parts; page 3, second column, line 41, claim 2, for "up" read upon; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.